(12) United States Patent
Gharpure

(10) Patent No.: US 8,799,930 B2
(45) Date of Patent: *Aug. 5, 2014

(54) EVENT-DRIVEN COMPONENT INTEGRATION FRAMEWORK FOR IMPLEMENTING DISTRIBUTED SYSTEMS

(71) Applicant: International Business Machines Corporation, Armonk, NY (US)

(72) Inventor: Jagannath T. Gharpure, Plano, TX (AG)

(73) Assignee: International Business Machines Corporation, Armonk, NY (US)

( * ) Notice: Subject to any disclaimer, the term of this patent is extended or adjusted under 35 U.S.C. 154(b) by 0 days.
This patent is subject to a terminal disclaimer.

(21) Appl. No.: 14/083,171

(22) Filed: Nov. 18, 2013

(65) Prior Publication Data

US 2014/0082636 A1 Mar. 20, 2014

Related U.S. Application Data

(63) Continuation of application No. 12/014,479, filed on Jan. 15, 2008, now Pat. No. 8,612,997.

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/318; 719/713

(58) Field of Classification Search
None
See application file for complete search history.

(56) References Cited

U.S. PATENT DOCUMENTS

| | | | |
|---|---|---|---|
| 5,892,900 | A | 4/1999 | Ginter et al. |
| 6,067,298 | A | 5/2000 | Shinohara |
| 6,934,931 | B2 | 8/2005 | Plumer et al. |
| 2002/0159464 | A1 | 10/2002 | Lewis |
| 2004/0031040 | A1 | 2/2004 | Chheda et al. |
| 2004/0160970 | A1 | 8/2004 | Dally et al. |
| 2005/0108726 | A1 | 5/2005 | Need et al. |
| 2005/0149941 | A1 | 7/2005 | Watson et al. |
| 2006/0218532 | A1 | 9/2006 | Cordella et al. |
| 2006/0294527 | A1 | 12/2006 | Hardin et al. |
| 2007/0041665 | A1 | 2/2007 | Kondo et al. |
| 2007/0074166 | A1 | 3/2007 | Overturf et al. |

FOREIGN PATENT DOCUMENTS

WO 0113226 A1 2/2001

OTHER PUBLICATIONS

U.S. Appl. No. 12/014479 entitled "Event-Driven Component Integration Framework for Implementing Distributed Systems"; Non-final office action dated Apr. 28, 2011.
U.S. Appl. No. 12/014479 entitled "Event-Driven Component Integration Framework for Implementing Distributed Systems"; Final office action dated Oct. 31, 2011.
U.S. Appl. No. 12/014479 entitled "Event-Driven Component Integration Framework for Implementing Distributed Systems"; Non-final office action dated Apr. 22, 2013.
U.S. Appl. No. 12/014479 entitled "Event-Driven Component Integration Framework for Implementing Distributed Systems"; Notice of Allowance dated Aug. 14, 2013.
Maurer, P., "Gateways: A technique for Adding Event Driven Behavior to Compiled Simulations," IEEE Transactions on Computer Aided Deisgn of Integrated Circuits and Systems, vol. 13, No. 3, Mar. 1994, pp. 338-352. (Abstract, Aug. 6, 2002).

Primary Examiner — H S Sough
Assistant Examiner — Craig Dorais
(74) Attorney, Agent, or Firm — Yudell Isidore Ng Russell PLLC; John Pivnichny

(57) ABSTRACT

An event driven component, in a distributed system of software components, utilizes a buffered port. Within the distributed system of software components are the event-driven component; accepting means for accepting input events arriving at an input gateway; a coarse-grained component for providing a coarse-grained function that provides a set of services; decision means, in the input port, for creating a buffered port that provides a queue for each of the services according to a configurable policy; an event registry in which the event driven component registers its interest in accepting a subset of the events and its interest in generating output when executing the set of services, wherein each service in the set of services is associated with one or more events; distributing means for distributing the events to the input port; and an output gateway for dispatching a generated output event to an output port.

12 Claims, 7 Drawing Sheets

EVENT-DRIVEN COMPONENT INTEGRATION FRAMEWORK FOR IMPLEMENTING DISTRIBUTED SYSTEMS

PRIORITY CLAIM

This application is a continuation of U.S. patent application Ser. No. 12/014,479, entitled "EVENT-DRIVEN COMPONENT INTEGRATION FRAMEWORK FOR IMPLEMENTING DISTRIBUTED SYSTEMS," filed on Jan. 15, 2008, now U.S. Pat. No. 8,612,997 B2, the disclosure of which is incorporated herein by reference in its entirety for all purposes

BACKGROUND OF THE INVENTION

1. Technical Field

The present disclosure relates in general to the field of computers, and more particularly to the computer systems. Still more particularly, the present disclosure relates to distributed computer systems.

2. Description of the Related Art

A software system is made up of components, which are typically class objects. Current approaches to implementing a distributed system of components use a central mechanism such as an ORB (Object Request Broker), a message hub, a blackboard, or a central database. ORB utilizes interfaces that are defined using IDL (Interface Definition Language), allowing the ORB to provide mechanisms for remote object location and invocation. A message hub coordinates messages between various components. Blackboard architectures allow components to share data via messages that are posted to a virtual blackboard. Central databases provide a centralized control of information to achieve information sharing among distributed components (and hence their integration).

None of these approaches provide a buffered and distributed control at every component of the distributed system. This leads to queuing up of control at the central mechanism, and requires significant custom development (i.e., custom coding) for enhancements for each of the components of the distributed system. This problem is particularly burdensome in a Service Oriented Architecture (SOA), in which components register, publish, discover and invoke services using SOA infrastructures such as service registry, enterprise service bus, business process, service choreographer, etc.

SUMMARY OF THE INVENTION

An event driven component, in a distributed system of software components, utilizes a buffered port. Within the distributed system of software components are the event-driven component; accepting means for accepting input events arriving at an input gateway; a coarse-grained component for providing a coarse-grained function that provides a set of services; decision means, in the input port, for creating a buffered port that provides a queue for each of the services according to a configurable policy; an event registry in which the event driven component registers its interest in accepting a subset of the events and its interest in generating output when executing the set of services, wherein each service in the set of services is associated with one or more events; distributing means for distributing the events to the input port; and an output gateway for dispatching a generated output event to an output port.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
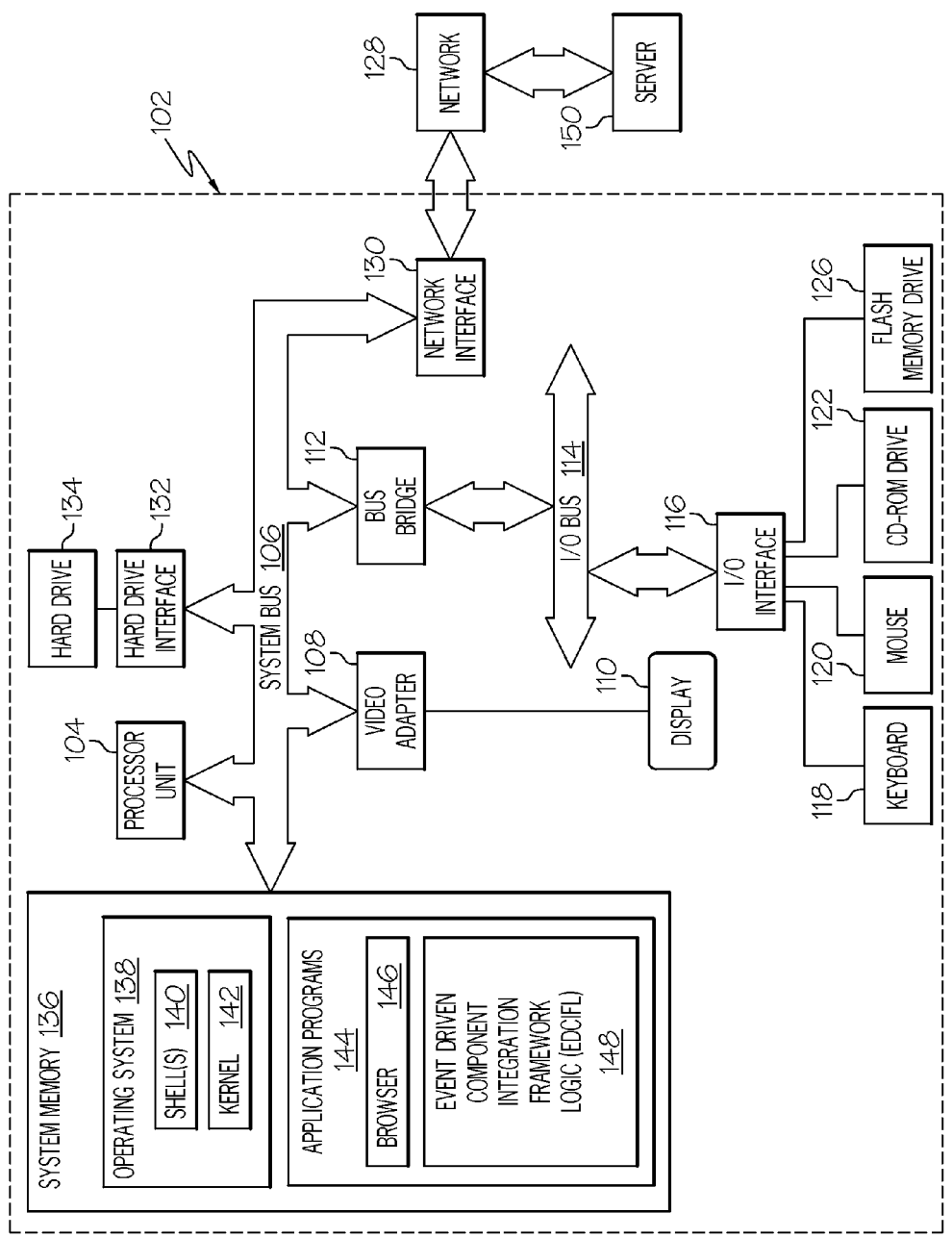
FIG. 1 illustrates an exemplary computer in which the present invention may be utilized.

With reference now to FIG. 1, there is depicted a block diagram of an exemplary computer 102, in which the present invention may be utilized. Note that some or all of the exemplary architecture shown for computer 102 may be utilized by software deploying server 150.

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as software deploying server 150's system memory) also include an Event Driven Component Integration Framework Logic (EDCIFL) 148. EDCIFL 148 includes code for implementing the processes described in FIGS. 2-5B. In one embodiment, computer 102 is able to download EDCIFL 148 from software deploying server 150, including in an "on demand" basis, as described in greater detail below in FIGS. 4A-5B.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of EDCIFL 148), thus freeing computer 102 from having to use its own internal computing resources to execute EDCIFL 148.

Figure 2:
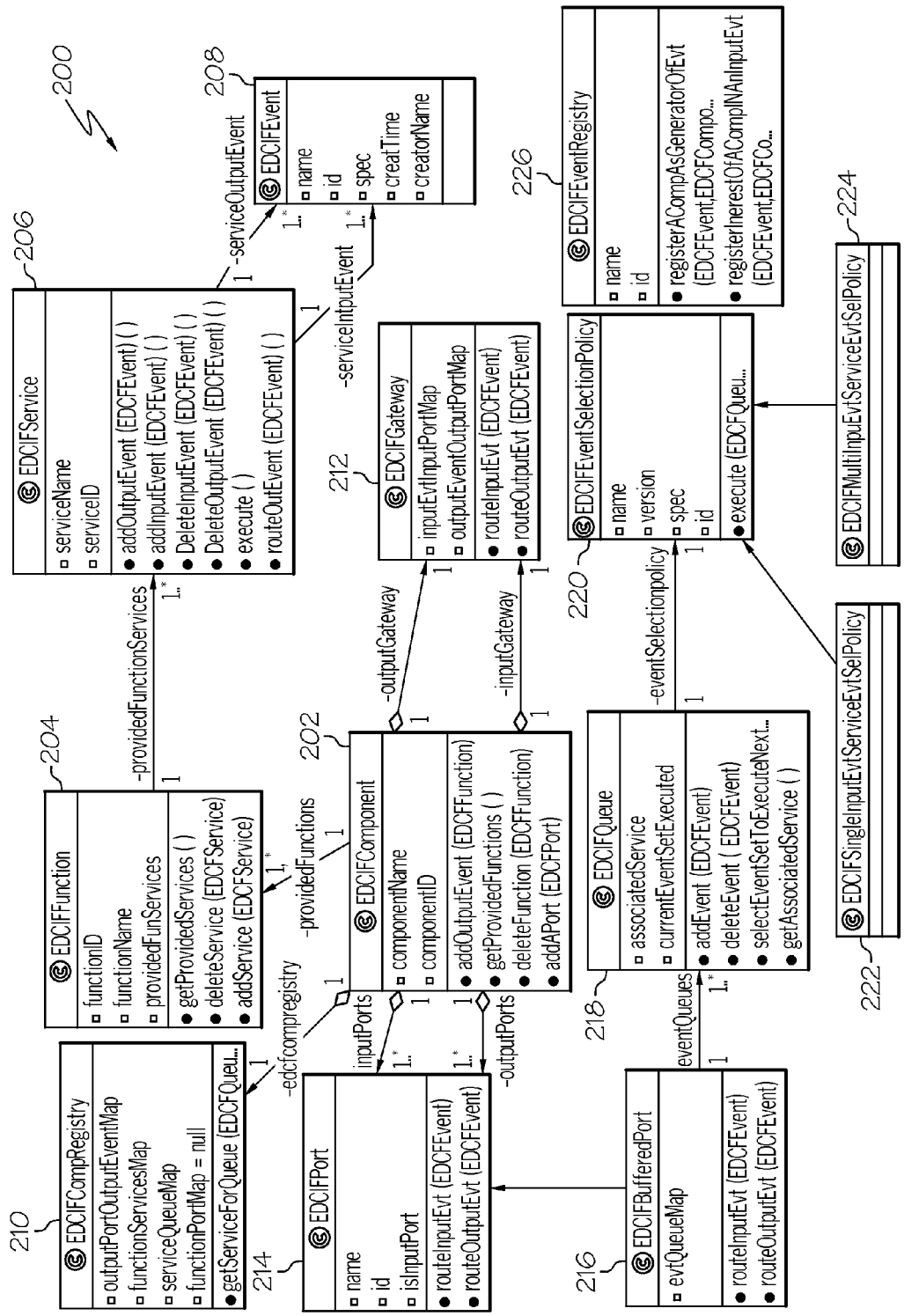
FIG. 2 depicts an exemplary representation of software components utilized by the present invention.

With reference now to FIG. 2, a Unified Modeling Language™ (UML®) ("Unified Modeling Language" and "UML" are either registered trademarks or trademarks of Object Management Group, Inc. in the United States and/or other countries) model depicting an exemplary representation of components utilized by the present invention is presented. Each component is a class that has a number of provided and required interfaces, which form the basis for wiring components together, either using dependencies, or by using connectors. A provided interface is one that is either implemented directly by the component or one of its realizing classifiers, or it is a type of a provided port of the component. A required interface is designated by a usage dependency from the component or one of its realizing classifiers, or it is the type of a required port.

The required and provided interfaces of a component allow for the specification of structural features, such as attributes and association ends, as well as behavioral features such as operations and events. A component may implement a provided interface directly, or its realizing classifiers may do so. The required and provided interfaces may optionally be organized through ports, thus enabling the definition of named sets of provided and required interfaces that are typically (but not always) addressed at run-time.

Referring then to details of the model 200 shown in FIG. 2, all components represented ultimately extend from the base EDCIFComponent (202). Assume for exemplary purposes only, that model 200 is for an automobile rental agency's operations. EDCIFFunction (204) may be for a coarse-grained function, such as which cities have outlets for that rental agency. In such a scenario, EDCIFService (206) may be a fine-grained component for issues such as rental costs, car availability, etc. Each EDCIFService 206 is associated with one or more EDCIFEvents (208), which are triggers for the service represented by EDCIFService 206. Examples of such triggers are requests for a rental quote, a pre-determined date being reached, etc. Thus, an event is an object that is a record of an activity in a system. The event signifies the activity, and an event may be related to other events. An event has three aspects; form (name, time of occurrence, other attributes), significance, and relativity (both in timing and in spatial relationship within the model 200).

When an event (trigger) occurs (EDCIFEvent 208), EDCIFCompRegistry (210) has a record of whether the base EDCIFComponent 202 has an interest in this event being input. If so, then a EDCIFGateway (212) provides a map/directory that routes the event to an appropriate EDCIFPort (214). In one embodiment, EDCIFPort is directly associated with, and dedicated for use only by, EDCIFComponent 202, the event-driven component. In one embodiment, the events are buffered in an EDCIFBufferedPort (216), which is a class having inheritance properties from the EDCIFPort 214. These events are stored on an EDCIFQueue (218) according to an EDCIFEventSelectionPolicy (220). This selection policy (220) is under the control of either a single input event service event selection policy (EDCIFSingleInputEvtSelPolicy 222) or a multiple input event service event selection policy (EDCIFMultiInputEvtServiceEvtSelPolicy 224), depending on how many events are expected by a service. Note that the EDCIFEventRegistry (226) monitors and controls whether an input event is valid or not, thus determining if the event being input is authorized to be directed to the EDCIFGateway 212.

Thus, model 200 presents an event driven component (202) in a distributed system of software components (200). The distributed system of software components includes: accepting means (inputGateway shown with EDCIFGateway 212) for accepting input events arriving at an input gateway (212); a coarse-grained component (204) for providing a coarse-grained function via an input port (214), wherein the coarse-grained function provides a set of services (206); decision means, in the input port, for creating a buffered port (216) that provides a queue (218) for each of the services according to a configurable policy (220, 222, 224); an event registry (226) in which an event driven component (202) registers its interest in accepting a subset of the events and its interest in generating output when executing the subset of the services, wherein each of the services (206) is associated with one or more events (208); distributing means (with 202) for distributing the events, via the input gateway, to the input port (214); and an output gateway (associated with 202) for dispatching a generated output event to an output port (214).

Figure 3:
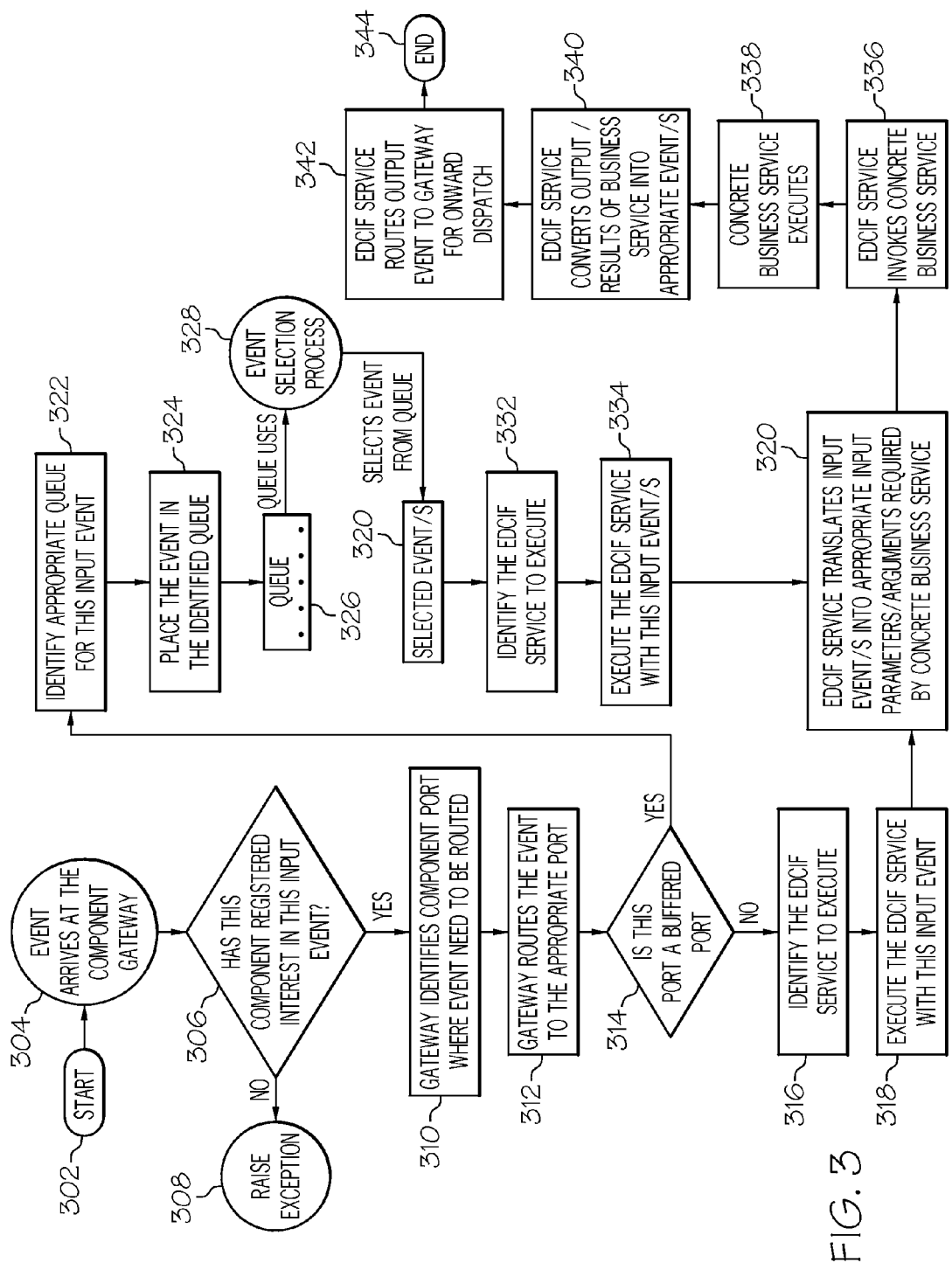
FIG. 3 is a high-level flow-chart describing how to implement distributed systems using event-driven component integration.

Referring now to FIG. 3, a high-level flow-chart describing how the model 200 executes to implement distributed systems using event-driven component integration is presented. After initiator block 302, an event arrives at the component gateway (block 304). A query is made as to whether the main EDCIF component has registered an interest in this type of event input with the EDCIF event registry (block 306). If not, then an exception is raised (an alarm or warning signal is generated), as indicated by terminator block 308. However, if the main EDCIF component has registered an interest in this type of event input with the EDCIF event registry, then the EDCIF gate identifies which component EDCIF port should be used (block 310), and the event is directed to that port (block 312). If the port to which the event is directed is not buffered (query block 314), then the appropriate EDCIF service is identified (block 316) for direct execution (block 318). The EDCIF service then translates the input event(s) into their appropriate input parameters/arguments that are required by a concrete business service that has been identified by the EDCIF service (block 320).

Returning to query block 314, if the port is buffered (has one or more input queues), then the appropriate EDCIF queue for that input event is identified (block 322) for placement (block 324) of the input event in the identified queue (block 326). The queue 326 then uses an event selection process 328 to select one or more events from a selected queue to identify selected event(s) (block 330). The appropriate EDCIF service is then identified for the event that has been lifted from the queue (block 332) and executed (block 334). The selected event that is pulled from the queue is identified and selected by a policy that has been set by the EDCIF component 202 shown in FIG. 2. This policy may be based on the policy selection set by the EDCIF EventSelectionPolicy 220 shown in FIG. 2.

The process again picks up at block 320, in which the EDCIF service translates the input event(s). The appropriate EDCIF service then invokes the specific (concrete) business service that has been identified by the EDCIF service (block 336) for execution (block 338). The EDCIF service then converts the output results of that concrete business service into appropriate output events (block 340), such as calculation results, completion alerts, etc. The EDCIF service then routes these output event(s) to the EDCIF gateway for onward dispatch to the next process (block 342), and the process ends (terminator block 344).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of EDCIFL 148, are performed by service provider server 150. Alternatively, EDCIFL 148 and the method described herein, and in particular as shown and described in FIGS. 2-3, can be deployed as a process software from service provider server 150 to computer 102. Still more particularly, process software for the method so described may be deployed to service provider server 150 by another service provider server (not shown).

Figure 4A:
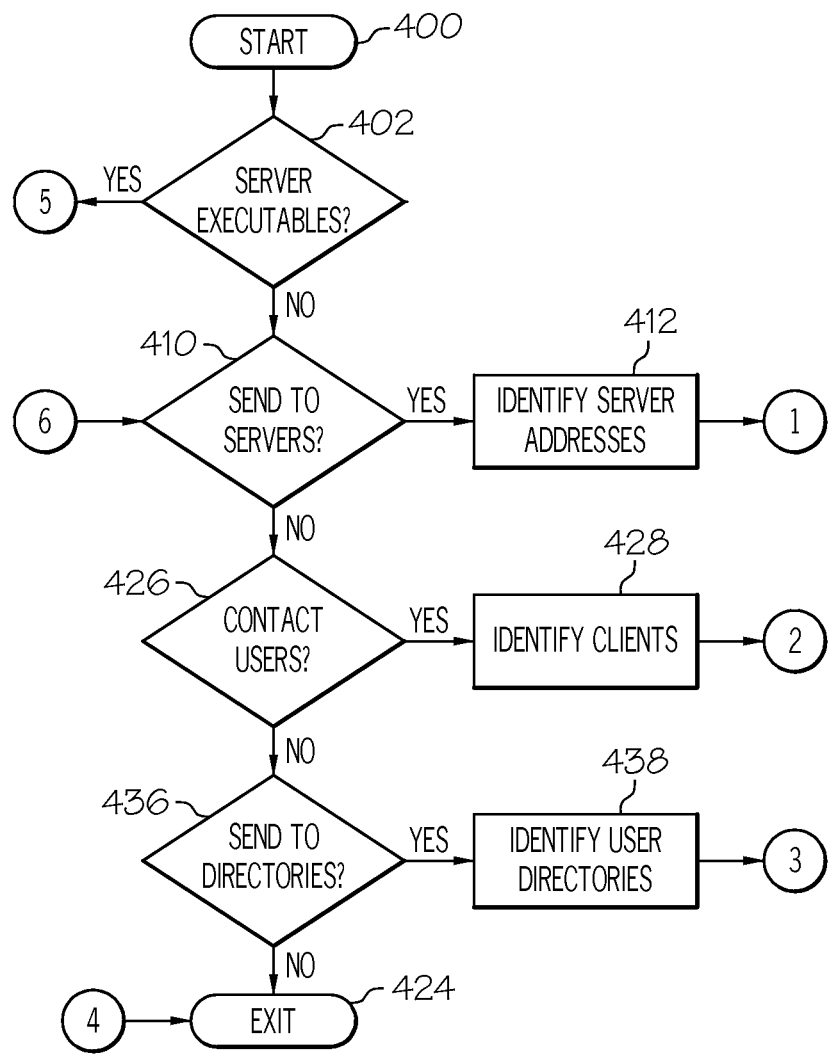
FIGS. 4A-B are flow-charts showing steps taken to deploy software capable of executing the steps and processes described in FIGS. 2-3.
Figure 4B:
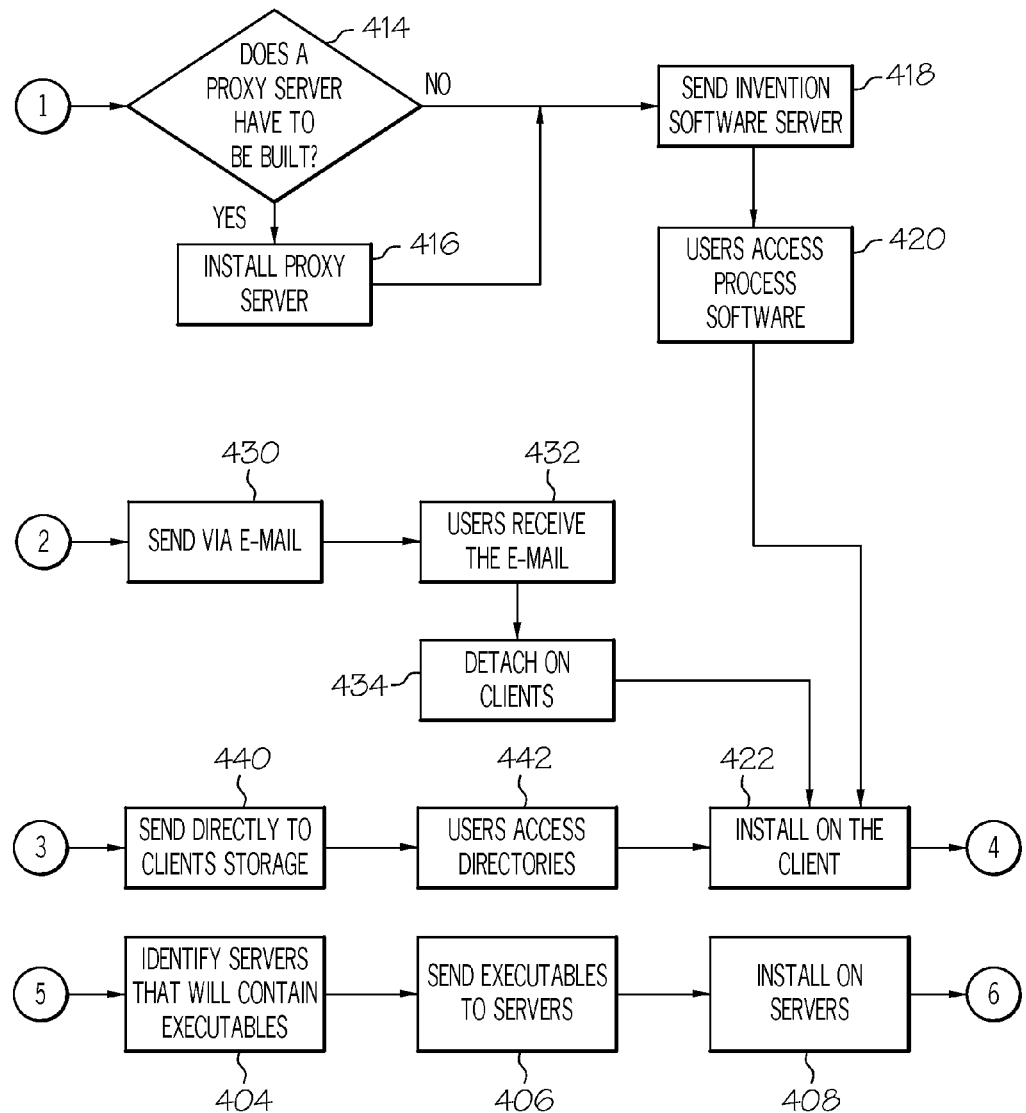

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
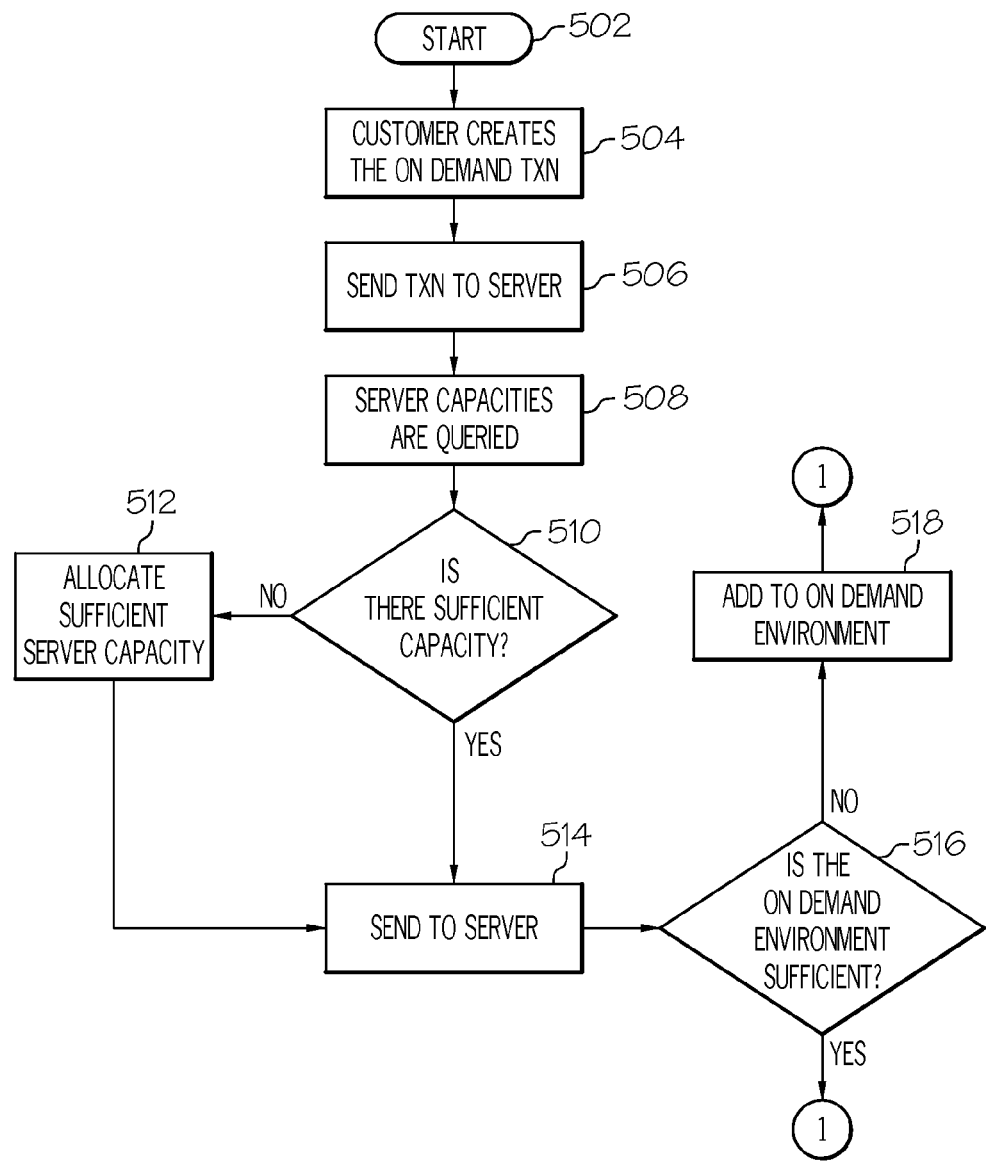
FIGS. 5A-B are flow-charts showing steps taken to execute the steps and processes shown in FIGS. 2-3 using an on-demand service provider.
Figure 5B:
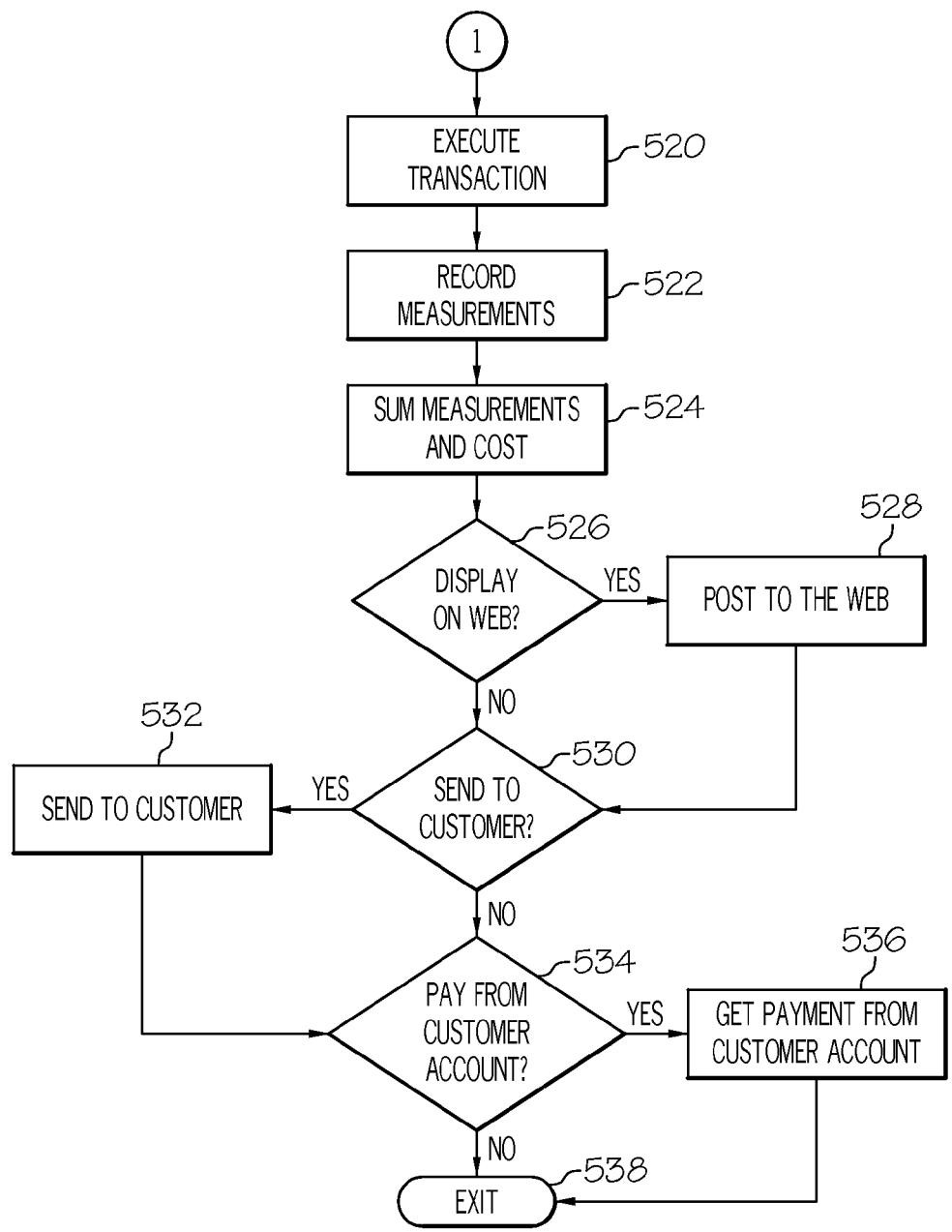

With reference now to FIGS. 5A-B, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the server's available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

As disclosed herein, the present invention presents a new approach to implementing distributed system of components via an Event Driven Component Integration Framework (EDCIF). The EDCIF provides for distributed buffers and control at the component level.

The EDCIF described herein provides a process for event based distributed component integration where:

A component accepts input events and produces output events;

A component has an input gateway where events arrive;

The component input gateway distributes the arriving events to relevant input port;

An input port provides a major coarse-grained function;

A major coarse-grained function provides a set of services;

An input port can be a buffered or un-buffered port;

A buffered port provides a queue for each service;

Input events for a service are received in a queue for that service;

The queue has configurable policy/ies and rules for selecting event/s waiting in the queue. This policy is specialized based on if a single input event is expected by a service or if multiple input events are expected by a service;

A component registers with an event registry its interest in a set of events that it will accept as input events for various functions/services that the component provides;

A component registers with an event registry its interest in a set of events that it will generate as output when it executes various services. These events are then available to other components that have registered interest in receiving these events; and A component has an output gateway from where the component dispatches the output events.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A distributed system, comprising:
multiple computer systems; and
a distributed system of software components configured to execute on the computer systems, wherein the software components, when executed on the computer systems, are configured to provide:
an input gateway for accepting input events;
a distribution component for distributing the input events, via the input gateway, to an input port;
an event registry in which an event driven component registers an interest in accepting a subset of the input events to generate output events when executing a plurality of services, wherein each service in the plurality of services is associated with one or more events;
a coarse-grained component for providing a coarse-grained function via the input port, wherein the coarse-grained function provides the plurality of services;
a buffered port that provides respective queues corresponding to each of the plurality of services according to a configurable policy, wherein the buffered port is dedicated to be exclusively used by the event driven component, and wherein each of the queues:
holds at least one of the subset of the input events,
selects an input event of the at least one of the subset of input events using the configurable policy, and
provides the selected input event to the coarse-grained component which generates an output event by applying the service associated with a respective one of the queues to the selected input event; and an output gateway for dispatching the generated output event to an output port, wherein the distributed system is further configured to:
    in response to the event driven component having registered an interest in a first input event, identify an identified input port that should receive the first input event;
    in response to determining that the identified input port is buffered, identify an appropriate identified queue for handling the input event;
    select the first input event from the appropriate identified queue according to a policy set by the event driven component; and
    utilize the identified service to translate the first input event into appropriate input arguments that are required for a specific business service.

2. The distributed system of claim 1, wherein the input port and the output port are buffered ports.

3. The distributed system of claim 1, wherein the configurable policy is based on a single input event service.

4. The distributed system of claim 1, wherein the configurable policy is based on a multiple input event service.

5. The distributed system of claim 1, wherein the generated output event is available to other components in the distributed system of software components.

6. The distributed system of claim 1, wherein each of the software components are object classes.

7. A computer-implemented method for managing a distributed system of software components, the method comprising:
    establishing, by at least one of multiple processors, an input gateway for accepting input events to the distributed system of software components;
    creating, by at least one of the processors, a distribution component for distributing the input events, via the input gateway, to an input port;
    creating, by at least one of the processors, an event registry in which an event driven component registers an interest in accepting a subset of the input events to generate output events when executing a plurality of services, wherein each service in the plurality of services is associated with one or more events;
    providing, by at least one of the processors, a coarse-grained function via the input port, wherein the coarse-grained function provides the plurality of services;
    creating, at the input port, a buffered port that provides respective queues for each of the plurality of services according to a configurable policy, and wherein each of the queues:
        holds at least one of the subset of the input events,
        selects an input event of the at least one of the subset of input events using the configurable policy, and
        provides the selected input event to the course-grained component which generates an output event by applying the service associated with a respective one of the queues to the selected input event;
    creating, by at least one of the processors, an output gateway for dispatching the generated output event to an output port;
    in response to the event driven component having registered an interest in a first input event, identifying, by at least one of the processors, an identified input port that should receive the first input event;
    in response to determining that the identified input port is buffered, identifying, by at least one of the processors, an appropriate identified queue for handling the first input event;
    selecting, by at least one of the processors, the first input event from the appropriate identified queue according to a policy set by the event driven component; and
    utilizing, by at least one of the processors, the identified service to translate the first input event into appropriate input arguments that are required for a specific business service.

8. The method of claim 7, further comprising:
receiving the first input event at the input gateway;
determining if the event driven component has registered an interest in the first input event;
routing the first input event to the identified input port;
placing the first input event in the appropriate identified queue;
identifying an identified service that is associated with the first input event;
executing the identified service with the first input event;
invoking and executing the specific business service; and
outputting a result of the execution of the specific business service.

9. A computer program product, comprising:
a non-transitory computer-readable storage device; and
a computer program embodied on the computer-readable storage device, wherein the computer program, when executed on a distributed computer system, configures the distributed computer system to:
    establish an input gateway for accepting input events to a distributed system of software components;
    create a distribution component for distributing the input events, via the input gateway, to an input port;
    create an event registry in which an event driven component registers an interest in accepting a subset of the input events to generate output events when executing a plurality of services, wherein each service in the plurality of services is associated with one or more events;
    provide a coarse-grained function via the input port, wherein the coarse-grained function provides the plurality of services;
    create, at the input port, a buffered port that provides respective queues for each of the plurality of services according to a configurable policy, and wherein each of the queues:
        holds at least one of the subset of the input events,
        selects an input event of the at least one of the subset of input events using the configurable policy, and
        provides the selected input event to the course-grained component which generates an output event by applying the service associated with a respective one of the queues to the selected input event;
    create an output gateway for dispatching the generated output event to an output port;
    in response to the event driven component having registered an interest in a first input event, identify an identified input port that should receive the first input event;
    in response to determining that the identified input port is buffered, identify an appropriate identified queue for handling the first input event;
    select the first input event from the appropriate identified queue according to a policy set by the event driven component; and
    utilize the identified service to translate the first input event into appropriate input arguments that are required for a specific business service.

10. The computer program product of claim 9, wherein the instructions are further configured to:
  receive the first input event at the input gateway;
  determine if the event driven component has registered an interest in the first input event;
  route the first input event to the identified input port;
  place the first input event in the appropriate identified queue;
  identify an identified service that is associated with the first input event;
  execute the identified service with the first input event;
  invoke and execute the specific business service; and
  output a result of the execution of the specific business service.

11. The computer program product of claim 9, wherein the computer-readable storage device is a component of a remote server, and wherein the computer program is deployed to a supervisory computer from the remote server.

12. The computer program product of claim 9, wherein the computer program is provided by a service provider to a customer on an on-demand basis.

\* \* \* \* \*